United States Patent
Minegishi

(10) Patent No.: US 10,658,965 B2
(45) Date of Patent: May 19, 2020

(54) MOTOR VEHICLE

(71) Applicant: TOYOTA JIDOSHA KABUSHIKI KAISHA, Toyota-shi, Aichi-ken (JP)

(72) Inventor: Shinichiro Minegishi, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/242,539

(22) Filed: Jan. 8, 2019

(65) Prior Publication Data

US 2019/0214931 A1 Jul. 11, 2019

(30) Foreign Application Priority Data

Jan. 9, 2018 (JP) .................. 2018-001178

(51) Int. Cl.
- *H02P 27/06* (2006.01)
- *H02P 29/024* (2016.01)
- *B60L 3/00* (2019.01)
- *B60L 50/51* (2019.01)
- *H02P 29/66* (2016.01)
- *H02P 5/74* (2006.01)

(52) U.S. Cl.
CPC .............. *H02P 27/06* (2013.01); *B60L 3/003* (2013.01); *B60L 50/51* (2019.02); *H02P 5/74* (2013.01); *H02P 29/027* (2013.01); *H02P 29/66* (2016.02); *B60L 2240/423* (2013.01); *B60L 2240/425* (2013.01)

(58) Field of Classification Search
CPC ........... H01L 2924/00014; H01L 2224/45015; H02M 1/32; H02M 7/5387
See application file for complete search history.

(56) References Cited

U.S. PATENT DOCUMENTS

| | | | | |
|---|---|---|---|---|
| 5,730,238 A | * | 3/1998 | Tamaki | B60L 3/0038 180/65.8 |
| 2006/0196714 A1 | * | 9/2006 | Sugimoto | B60W 20/13 180/242 |
| 2007/0093359 A1 | * | 4/2007 | Kobayashi | B60L 3/0069 477/107 |
| 2009/0009920 A1 | * | 1/2009 | Yamada | B60L 3/0023 361/93.1 |
| 2009/0021198 A1 | * | 1/2009 | Okamura | B60L 50/16 318/400.3 |
| 2010/0256851 A1 | * | 10/2010 | Mitsutani | B60L 50/61 701/22 |
| 2014/0232304 A1 | * | 8/2014 | Sekiya | H02P 3/18 318/400.02 |

(Continued)

FOREIGN PATENT DOCUMENTS

| JP | 2011-223871 A | 11/2011 |
|---|---|---|
| JP | 2014-27833 A | 2/2014 |

*Primary Examiner* — Shawki S Ismail
*Assistant Examiner* — Zoheb S Imtiaz
(74) *Attorney, Agent, or Firm* — Sughrue Mion, PLLC

(57) ABSTRACT

The motor vehicle comprises an overcurrent detector configured to detect overcurrent in each of a plurality of second switching elements included in the second inverter. When the motor vehicle has an abnormality and is driven by the emergency drive with output of a torque from the first motor to the one wheels, the motor vehicle performs zero torque control that controls the second inverter such that a torque of the second motor becomes equal to zero.

4 Claims, 7 Drawing Sheets

(56) References Cited

U.S. PATENT DOCUMENTS

| | | | |
|---|---|---|---|
| 2016/0009272 A1* | 1/2016 | Tanaka | B60W 20/13 701/22 |
| 2017/0085205 A1* | 3/2017 | Koseki | B62D 5/0484 |
| 2018/0034388 A1* | 2/2018 | Kawai | H03K 5/1536 |
| 2019/0039592 A1* | 2/2019 | Simonini | B60K 7/0007 |

* cited by examiner

MOTOR VEHICLE

CROSS-REFERENCE TO RELATED APPLICATIONS

The present disclosure claims priority to Japanese Patent Application No. 2018-001178 filed Jan. 9, 2018, which is incorporated herein by reference in its entirety including specification, drawings and claims.

TECHNICAL FIELD

The present disclosure relates to a motor vehicle.

BACKGROUND

A proposed configuration of a motor vehicle includes a first motor connected with first wheels, a first inverter configured to drive the first motor by switching of a plurality of first switching elements, a second motor connected with second wheels, a second inverter configured to drive the second motor by switching of a plurality of second switching elements, and a battery connected with the first inverter and the second inverter via power lines (as described in, for example, JP 2014-27833A).

SUMMARY

When the motor vehicle has an abnormality and is driven by emergency drive with output of a torque from the first motor to the first wheels, the motor vehicle of the above configuration performs gate shutoff of the second inverter for the simplicity of control. In the case of an on-failure (short circuit failure) occurring in any of the plurality of second switching elements included in the second inverter, however, this configuration makes it difficult to detect the on-failure (short circuit failure).

A main object of a motor vehicle of the present disclosure is thus to detect an on-failure occurring in a second inverter that is provided to drive a second motor, when the motor vehicle is driven by emergency drive with output of a torque from a first motor to first wheels.

In order to achieve the above primary object, the motor vehicle of the present disclosure employs the following configuration.

The present disclosure is directed to a motor vehicle. The motor vehicle includes a first motor connected with one wheels out of front wheels and rear wheels, a first inverter configured to drive the first motor by switching of a plurality of first switching elements, a second motor connected with the other wheels out of the front wheels and the rear wheels, a second inverter configured to drive the second motor by switching of a plurality of second switching elements, a power storage device connected with the first inverter and the second inverter via a power line, a control device configured to control the first inverter and the second inverter and an overcurrent detector configured to detect overcurrent in each of the plurality of second switching elements. When the motor vehicle has an abnormality and is driven by emergency drive with output of a torque from the first motor to the one wheels, the control device performs zero torque control that controls the second inverter such that a torque of the second motor becomes equal to zero.

The motor vehicle of this aspect includes the overcurrent detector configured to detect overcurrent in each of the plurality of second switching elements included in the second inverter. When the motor vehicle has an abnormality and is driven by emergency drive with output of a torque from the first motor to one wheels out of front wheels and rear wheels, the motor vehicle performs the zero torque control that controls the second inverter such that the torque of the second motor becomes equal to zero. The zero torque control performed in the case of an on-failure (short circuit failure) occurring in any of the plurality of second switching elements causes both two switching elements in a pair of the same phase (for example, upper and lower arms in a U phase) to be turned on and causes overcurrent to flow in the switching elements, when the other switching element (for example, lower arm in the U phase) forming the pair of the same phase with one switching element (for example, upper arm in the U phase) having an on-failure is turned on. The overcurrent detector detects the overcurrent. In the case of an on-failure occurring in any of the plurality of switching elements included in the second inverter, this configuration enables the on-failure to be detected.

DESCRIPTION OF EMBODIMENTS

The following describes some aspects of the disclosure with reference to embodiments.

Figure 1:
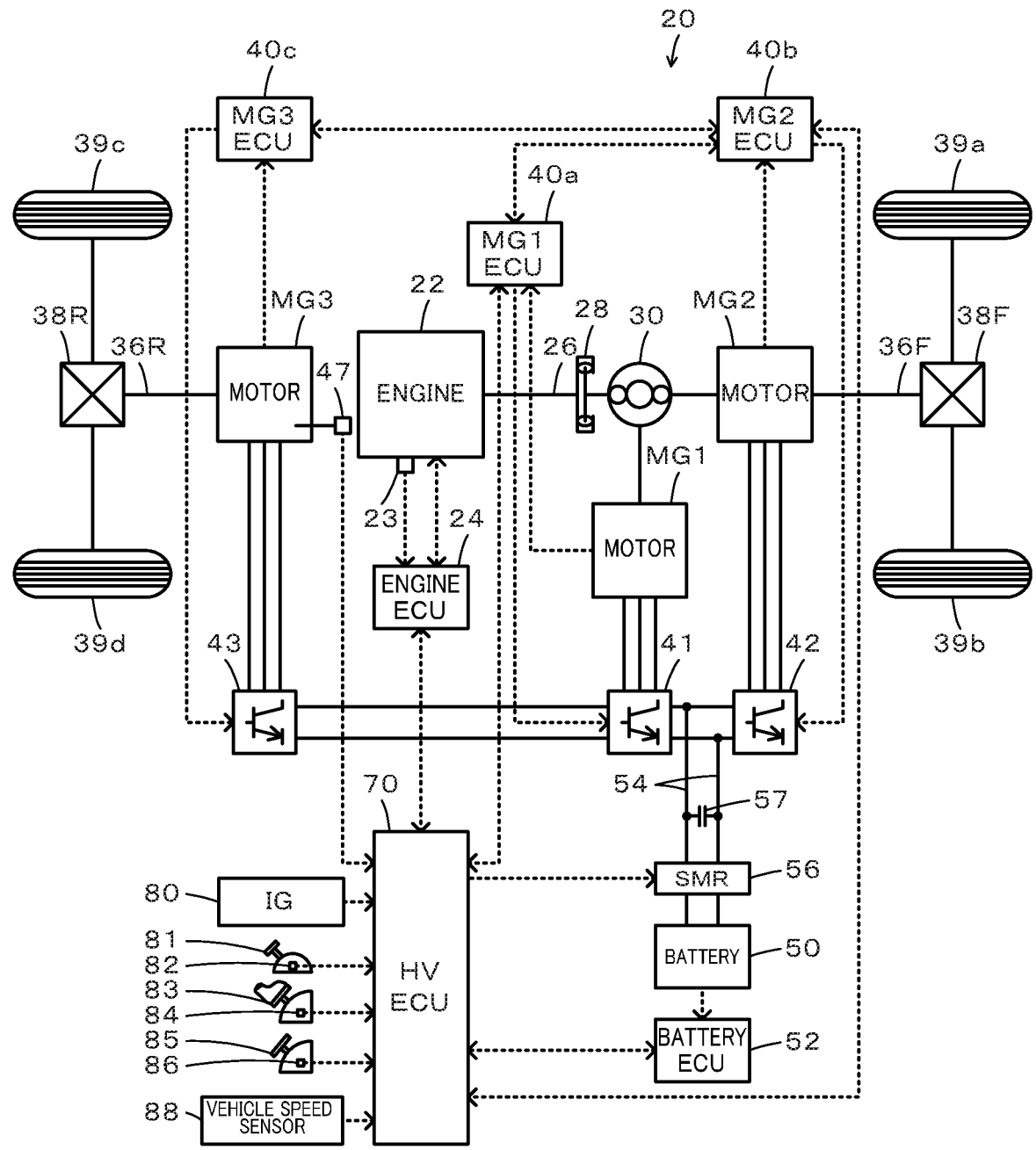
FIG. 1 is a configuration diagram illustrating the schematic configuration of a hybrid vehicle according to one embodiment of the present disclosure.
Figure 2:
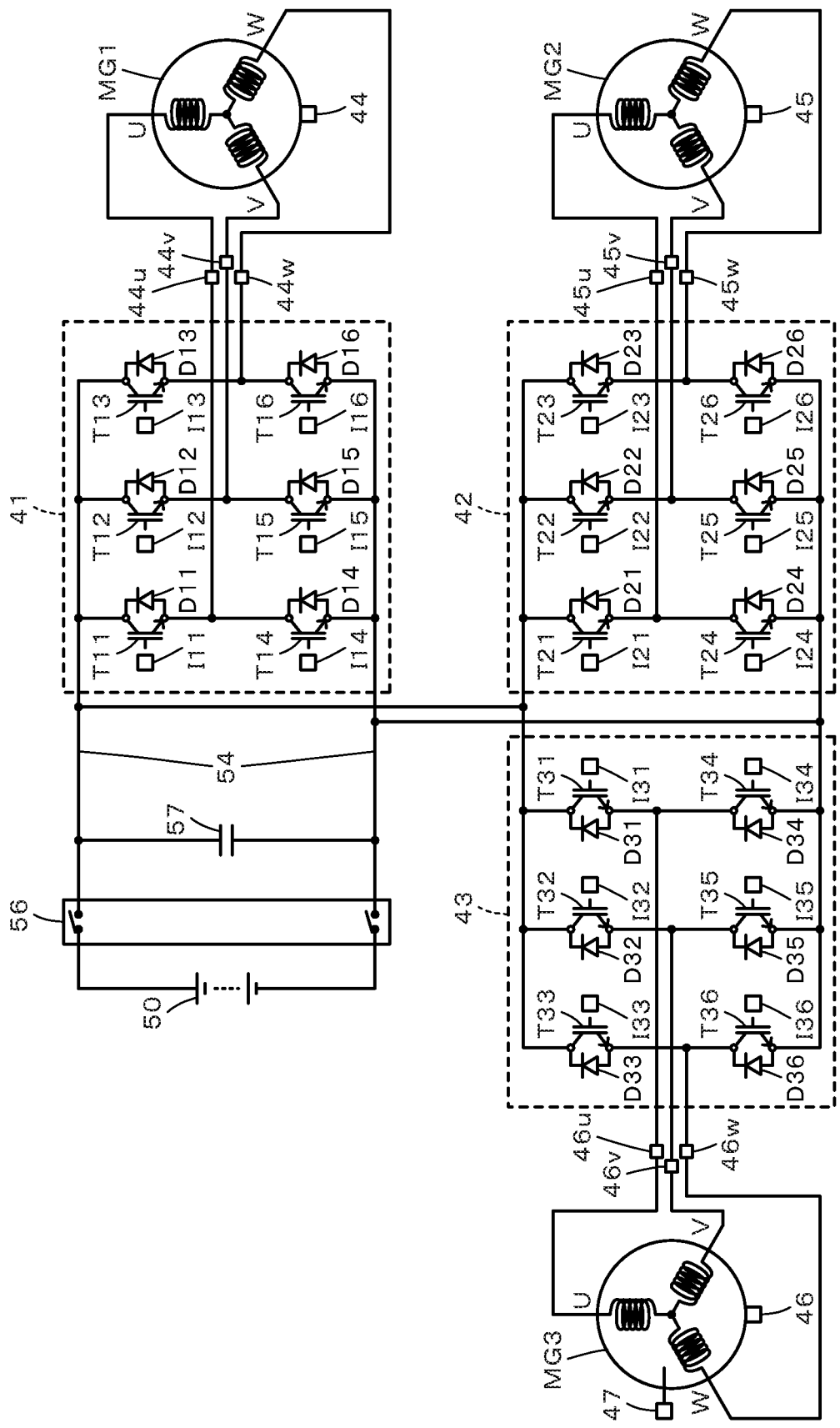
FIG. 2 is a configuration diagram illustrating the schematic configuration of an electrical driving system including motors MG1, MG2 and MG3.

FIG. 1 is a configuration diagram illustrating the schematic configuration of a hybrid vehicle 20 according to one embodiment of the present disclosure. FIG. 2 is a configuration diagram illustrating the schematic configuration of an electrical driving system including motors MG1, MG2 and MG3. As shown in FIG. 1, the hybrid vehicle 20 includes an engine 22, a planetary gear 30, motors MG1, MG2 and MG3, inverters 41, 42 and 43, a battery 50 serving as a power storage device, a system main relay 56, and a main electronic control unit (hereinafter referred to as "main ECU") 70.

The engine 22 is configured as an internal combustion engine that outputs power using, for example, gasoline or light oil as a fuel and is connected with a carrier of the planetary gear 30 via a damper 28. This engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23 configured to detect the rotational position of a crankshaft 26 of the engine 22, are input into the engine ECU 24 via the input port. Various control signals for operation control of the engine 22 are output from the engine ECU 24 via the output port. The engine ECU 24 is connected with the main ECU 70 via the respective communication ports. The engine ECU 24 calculates a rotation speed Ne of the engine 22, based on the crank angle θcr input from the crank position sensor 23.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36F linked with front wheels 39a and 39b via a differential gear 38F. The planetary gear 30 also includes a carrier that is connected with the crankshaft 26 of the engine 22 via a damper 28.

The motor MG1 is configured as a synchronous motor generator having a rotor with permanent magnets embedded therein and a stator with three-phase coils wound thereon and includes the rotor that is connected with the sun gear of the planetary gear 30 as described above. Like the motor MG1, the motor MG2 is also configured as a synchronous motor generator and includes a rotor that is connected with the driveshaft 36F. Like the motors MG1 and MG2, the motor MG3 is also configured as a synchronous motor generator and includes a rotor that is connected with a driveshaft 36R coupled with rear wheels 39c and 39d via a differential gear 38R.

The inverters 41, 42 and 43 are respectively used to drive the motors MG1, MG2 and MG3. As shown in FIG. 2, the inverter 41 is connected with power lines 54 and includes six transistors T11 to T16 serving as switching elements and six diodes D11 to D16 that are respectively connected in parallel to the six transistors T11 to T16. The transistors T11 to T16 are arranged in pairs, such that two transistors in each pair respectively serve as a source and as a sink relative to a positive electrode line and a negative electrode line of the power lines 54. The respective phases of the three-phase coils (U phase, V phase and W phase) of the motor MG1 are connected with connection points of the respective pairs of the transistors T11 to T16. Accordingly, when a voltage is applied to the inverter 41, a first motor electronic control unit (hereinafter referred to as "MG1 ECU") 40a regulates the rates of ON times of the respective pairs of the transistors T11 to T16 to provide a rotating magnetic field in the three-phase coils of the motor MG1 and thereby rotate and drive the motor MG1.

Like the inverter 41, the inverter 42 is also connected with the power lines 54 and includes six transistors T21 to T26 and six diodes D21 to D26. When a voltage is applied to the inverter 42, a second motor electronic control unit (hereinafter referred to as "MG2 ECU") 40b regulates the rates of ON times of the respective pairs of the transistors T21 to T26 to provide a rotating magnetic field in the three-phase coils of the motor MG2 and thereby rotate and drive the motor MG2.

Like the inverters 41 and 42, the inverter 43 is also connected with the power lines 54 and includes six transistors T31 to T36 and six diodes D31 to D36. When a voltage is applied to the inverter 43, a third motor electronic control unit (hereinafter referred to as "MG3 ECU") 40c regulates the rates of ON times of the respective pairs of the transistors T31 to T36 to provide a rotating magnetic field in the three-phase coils of the motor MG3 and thereby rotate and drive the motor MG3.

The MG1 ECU 40a is configured as a CPU-based microprocessor and includes a ROM configured to store processing programs, a RAM configured to temporarily store data, input/output ports and a communication port, in addition to the CPU, although not being illustrated. Signals from various sensors required for drive control of the motor MG1, for example, a rotational position θm1 from a rotational position detection sensor 44 configured to detect the rotational position of the rotor of the motor MG1, phase currents Iu1, Iv1 and Iw1 from current sensors 44u, 44v, and 44w configured to detect phase currents flowing in the respective phases of the motor MG1, and overcurrent detection signals from overcurrent detection circuits I11 to I16 configured to detect overcurrent in the transistors T11 to T16, are input into the MG1 ECU 40a via the input port. The overcurrent detection circuits I11 to I16 output an OFF signal as the overcurrent detection signal when no overcurrent is generated in the transistors T11 to T16, while outputting an ON signal as the overcurrent detection signal when overcurrent is generated in the transistors T11 to T16. The MG1 ECU 40a outputs, for example, switching control signals to the transistors T11 to T16 of the inverter 41 via the output port. The MG1 ECU 40a is connected with the MG2 ECU 40b and with the main ECU 70 via the respective communication ports. The MG1 ECU 40a calculates an electrical angle θe1, an angular velocity ωm1, and a rotation speed Nm1 of the motor MG1, based on the rotational position θm1 of the rotor of the motor MG1 input from the rotational position detection sensor 44.

The MG2 ECU 40b is configured as a CPU-based microprocessor and includes a ROM configured to store processing programs, a RAM configured to temporarily store data, input/output ports and a communication port, in addition to the CPU, although not being illustrated. Signals from various sensors required for drive control of the motor MG2, for example, a rotational position θm2 from a rotational position detection sensor 45 configured to detect the rotational position of the rotor of the motor MG2, phase currents Iu2, Iv2 and Iw2 from current sensors 45u, 45v, and 45w configured to detect phase currents flowing in the respective phases of the motor MG2, and overcurrent detection signals from overcurrent detection circuits I21 to I26 configured to detect overcurrent in the transistors T21 to T26, are input into the MG2 ECU 40b via the input port. The overcurrent detection circuits I21 to I26 output an OFF signal as the overcurrent detection signal when no overcurrent is generated in the transistors T21 to T26, while outputting an ON signal as the overcurrent detection signal when overcurrent is generated in the transistors T21 to T26. The MG2 ECU 40b outputs, for example, switching control signals to the transistors T21 to T26 of the inverter 42 via the output port. The MG2 ECU 40b is connected with the MG1 ECU 40a and with the main ECU 70 via the respective communication ports. The MG2 ECU 40b calculates an electrical angle θe2, an angular velocity θm2, and a rotation speed Nm2 of the motor MG2, based on the rotational position θm2 of the rotor of the motor MG2 input from the rotational position detection sensor 45.

The MG3 ECU 40c is configured as a CPU-based microprocessor and includes a ROM configured to store processing programs, a RAM configured to temporarily store data, input/output ports and a communication port, in addition to the CPU, although not being illustrated. Signals from various sensors required for drive control of the motor MG3, for example, a rotational position θm3 from a rotational position detection sensor 46 configured to detect the rotational position of the rotor of the motor MG3, phase currents Iu3, Iv3 and Iw3 from current sensors 46u, 46v, and 46w configured to detect phase currents flowing in the respective phases of the motor MG3, and overcurrent detection signals from overcurrent detection circuits 131 to 136 configured to detect overcurrent in the transistors T31 to T36, are input into the MG3 ECU 40c via the input port. The overcurrent detection circuits 131 to 136 output an OFF signal as the overcurrent detection signal when no overcurrent is generated in the transistors T31 to T36, while outputting an ON signal as the overcurrent detection signal when overcurrent is generated in the transistors T31 to T36. The MG3 ECU 40c outputs, for example, switching control signals to the transistors T31 to T36 of the inverter 43 via the output port. The MG3 ECU 40c is connected with the MG2 ECU 40b via the respective communication ports. The MG3 ECU 40c calculates an electrical angle θe3, an angular velocity θm3, and a rotation speed Nm3 of the motor MG3, based on the rotational position θm3 of the rotor of the motor MG3 input from the rotational position detection sensor 46.

The battery 50 is configured by, for example, a lithium ion rechargeable battery or a nickel metal hydride battery and is connected with the inverters 41, 42 and 43 via the power lines 54. A capacitor 57 for smoothing is mounted to the power lines 54. The battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor (not shown) placed between terminals of the battery 50, an electric current Ib of the battery 50 from a current sensor (not shown) mounted to an output terminal of the battery 50, and a temperature Tb of the battery 50 from a temperature sensor (not shown) mounted to the battery 50. The battery ECU 52 is connected with the main ECU 70 via the respective communication ports. The battery ECU 52 calculates a state of charge SOC, based on an integrated value of the electric current Ib of the battery 50 input from the current sensor (not shown). The state of charge SOC denotes a ratio of an accumulated amount of electricity (amount of electric power dischargeable from the battery 50) to the overall capacity of the battery 50.

The system main relay 56 is provided between the inverters 41, 42 and 43 with the capacitor 57 and the battery at the power lines 54. This system main relay 56 is controlled on and off by the main ECU 70 to connect and disconnect the battery 50 with and from the inverters 41, 42 and 43 and the capacitor 57.

The main ECU 70 is configured as a CPU-based microprocessor and includes a ROM configured to store processing programs, a RAM configured to temporarily store data, input/output ports and a communication port, in addition to the CPU, although not being illustrated. Signals from various sensors are input into the main ECU 70 via the input port. The signals input into the main ECU 70 include, for example, a temperature tm3 from a temperature sensor 47 configured to detect the temperature of the three-phase coils of the motor MG3, an ignition signal from an ignition switch 80, and a shift position SP from a shift position sensor 82 configured to detect an operating position of a shift lever 81. The input signals further include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The main ECU 70 outputs, for example, a control signal to the system main relay 56 via the output port. The main ECU 70 is connected with the engine ECU 24, with the MG1 ECU 40a and the MG2 ECU 40b, and with the battery ECU 52 via the respective communication ports.

The hybrid vehicle 20 of the embodiment having the above configuration sets a required driving force for running, based on the accelerator position Acc and the vehicle speed V, and drives and controls the engine 22 and the motors MG1, MG2 and MG3 (inverters 41, 42 and 43), such as to output a required power corresponding to the required driving force to the driveshafts 36F and 36R, by cooperative control of the main ECU 70, the engine ECU 24, the MG1 ECU 40a, the MG2 ECU 40b and the MG3 ECU 40c. For example, the following three modes (1) to (3) are provided as drive modes of the engine 22 and the motors MG1, MG2 and MG3:

(1) torque conversion drive mode: a mode of operating and controlling the engine 22, such that a power corresponding to the required power is output from the engine 22, and of driving and controlling the motors MG1, MG2 and MG3 (inverters 41, 42 and 43), such that the required power is output to the driveshafts 36F and 36R, accompanied with torque conversion of all the power output from the engine 22 by the planetary gear 30, the motor MG1 and either or both of the motors MG2 and MG3;

(2) charge-discharge drive mode: a mode of operating and controlling the engine 22, such that a power corresponding to a sum of the required power and electric power required to charge or discharge the battery 50 is output from the engine 22, and of driving and controlling the motors MG1, MG2 and MG3 (inverters 41, 42 and 43), such that the required power is output to the driveshafts 36F and 36R, accompanied with charge or discharge of the battery 50 and torque conversion of all or part of the power output from the engine 22 by the planetary gear 30, the motor MG1 and either or both of the motors MG2 and MG3; and (3) motor drive mode: a mode of stopping operation of the engine 22 and of driving and controlling the motors MG2 and MG3 (inverters 42 and 43), such that the required power is output to the driveshafts 36F and 36R from either or both of the motors MG2 and MG3.

In the event of some abnormality occurring in the vehicle during ordinary drive in the torque conversion drive mode, in the charge discharge drive mode or in the motor drive mode, the hybrid vehicle 20 of the embodiment performs an emergency drive with performing zero torque control to drive and control the motor MG3 (inverter 43) such as to make the torque of the motor MG3 equal to zero or performing gate shutoff of the inverter 43 (turning off all the transistors T31 to T36).

For example, in the case of an abnormality occurring in the battery 50, the hybrid vehicle 20 of the embodiment turns off the system main relay 56 and is driven in a battery-less running mode. The battery-less running mode is similar to the torque conversion drive mode, except performing the zero torque control of the motor MG3 or the gate shutoff of the inverter 43. In the case of an abnormality occurring in the main ECU 70, the engine ECU 24 or the MG1 ECU 40a, the hybrid vehicle 20 of the embodiment is driven in an emergency motor drive mode. In the emergency motor drive mode, the motor MG2 (inverter 42) is driven and controlled by the MG2 ECU 40b, such that a predetermined power is output from the motor MG2 to the driveshaft 36F.

Furthermore, in the hybrid vehicle 20 of the embodiment, the main ECU 70 performs a predetermined determination process to determine whether an on-failure (short circuit failure) occurs in any of the transistors T31 to T36 of the inverter 43. The predetermined determination process is performed by the main ECU 70, based on the temperature tm3 of the three-phase coils of the motor MG3 from the temperature sensor 47 and the phase currents Iu3, Iv3 and Iw3 of the respective phases of the motor MG3 that are input by communication from the current sensors 46u, 46v and 46w via the MG3 ECU 40c and the MG2 ECU 40b. More specifically, the main ECU 70 calculates processed phase currents Iu3mo, Iv3mo and Iw3mo by a smoothing process of the phase currents Iu3, Iv3 and Iw3 of the respective phases of the motor MG3 with a sufficiently large time constant τ, compares the temperature tm3 of the three-phase coils of the motor MG3 with a reference value tm3ref and compares the processed phase currents Iu3mo, Iv3mo and Iw3mo with a reference value Iref.

When the temperature tm3 of the three-phase coils of the motor MG3 is equal to or lower than the reference value tm3ref and all the processed phase currents Iu3mo, Iv3mo and Iw3mo are equal to or lower than the reference value Iref, the main ECU determines that no on-failure occurs in any of the transistors T31 to T36. When the temperature tm3 of the three-phase coils of the motor MG3 is higher than the reference value tm3ref or when any of the processed phase currents Iu3mo, Iv3mo and Iw3mo is higher than the reference value Iref, on the other hand, the main ECU 70 determines that an on-failure occurs in any of the transistors T31 to T36. When determining that an on-failure occurs in any of the transistors T31 to T36, the main ECU 70 sends information indicating the occurrence of an on-failure (hereinafter called "on-failure information") to the MG3 ECU 40c via the MG2 ECU 40b.

Figure 3:
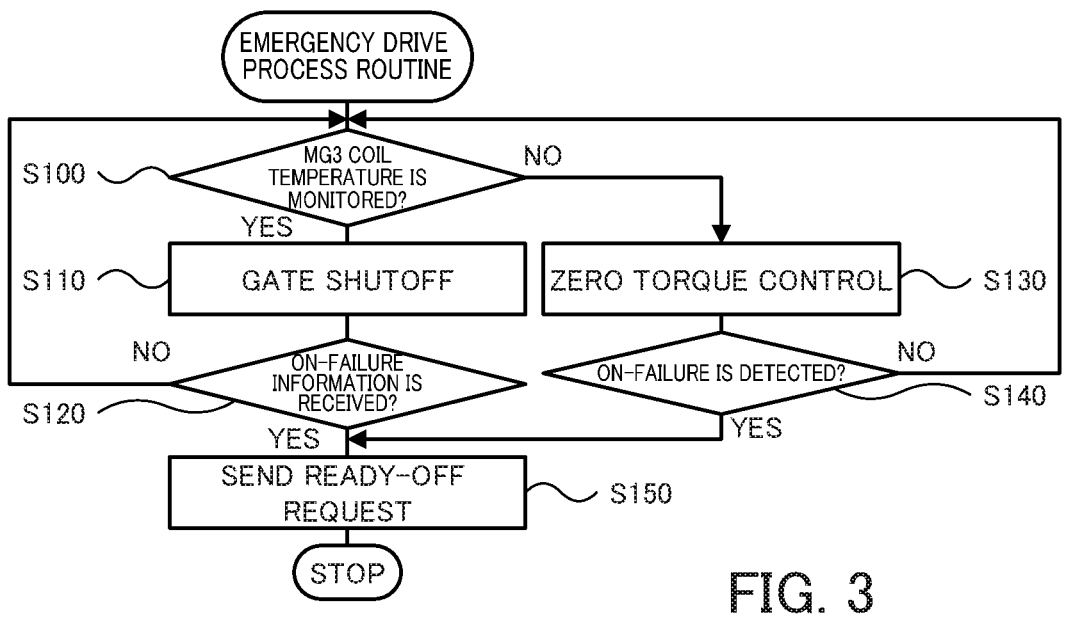
FIG. 3 is a flowchart showing one example of an emergency drive process routine performed by a MG3 ECU.

The following describes the operations of the hybrid vehicle 20 of the embodiment configured as described above or more specifically a series of control of the inverter 43 by the MG3 ECU 40c during emergency drive. FIG. 3 is a flowchart showing one example of an emergency drive process routine performed by the MG3 ECU 40c. This routine is triggered by a start of emergency drive.

When the emergency drive process routine of FIG. 3 is triggered, the MG3 ECU 40c first determines whether the main ECU 70 monitors the temperature tm3 of the three-phase coils of the motor MG3 (step S100). This determination may be performed by communication with the main ECU 70 via the MG2 ECU 40b. The main ECU 70 fails to monitor the temperature tm3 of the three-phase coils of the motor MG3, for example, when an abnormality occurs in the temperature sensor 47, when an abnormality occurs in a signal line between the temperature sensor 47 and the main ECU 70 or when an abnormality occurs in the main ECU 70. The main ECU does not perform the predetermined determination process when failing to monitor the temperature tm3 of the three-phase coils of the motor MG3.

When it is determined at step S100 that the main ECU 70 monitors the temperature tm3 of the three-phase coils of the motor MG3, the MG3 ECU 40c performs the gate shutoff of the inverter 43 (step S110) and determines whether the on-failure information is received from the main ECU 70 via the MG2 ECU 40b (step S120). When it is determined that the on-failure information is not received, the MG3 ECU 40c determines that no on-failure occurs in any of the transistors T31 to T36 and returns to step S100. When it is determined that the on-failure information is received, on the other hand, the MG3 ECU 40c determines that an on-failure occurs in any of the transistors T31 to T36, sends a ready-off request to the main ECU 70 via the MG2 ECU 40b (step S150) and then terminates this routine. When receiving the ready-off request from the MG3 ECU 40c via the MG2 ECU 40b, the main ECU 70 sends drive stop requests of the engine 22 and the motors MG1, MG2 and MG3 to the engine ECU 24, the MG1 ECU 40a and the MG2 ECU 40b and to the MG3 ECU 40c via the MG2 ECU 40b and causes the engine ECU 24, the MG1 ECU 40a, the MG2 ECU 40b and the MG3 ECU 40c to respectively stop driving the engine 22 and the inverters 41, 42 and 43. This falls into the ready-off state (system stop).

When it is determined at step S100 that the main ECU 70 fails to monitor the temperature tm3 of the three-phase coils of the motor MG3, the MG3 ECU 40c performs the zero torque control of the motor MG3 (step S130) and performs the predetermined determination process, based on overcurrent detection signals from the overcurrent detection circuits 131 to 136 (step S140). When it is determined that no on-failure occurs in any of the transistors T31 to T36, the MG3 ECU 40c returns to step S100. When it is determined that an on-failure occurs in any of the transistors T31 to T36, on the other hand, the MG3 ECU 40c sends the ready-off request to the main ECU 70 via the MG2 ECU 40b (step S150) and then terminates this routine.

When the main ECU 70 fails to monitor the temperature tm3 of the three-phase coils of the motor MG3, the main ECU does not perform the predetermined determination process. In this case, the MG3 ECU 40c performs the predetermined determination process, based on the overcurrent detection signals from the overcurrent detection circuits 131 to 136, as described above. The gate shutoff of the inverter 43 causes no overcurrent to flow in any of the transistors T31 to T36 even when an on-failure occurs in any of the transistors T31 to T36. This makes it difficult to detect the on-failure. According to the embodiment, however, the MG3 ECU 40c performs the zero torque control of the motor MG3. In the case where an on-failure occurs in any of the transistors T31 to T36, the zero torque control of the motor MG3 causes both two transistors in a pair of the same phase (for example, transistors T31 and T34 in the U phase) to be turned on and causes overcurrent to flow in the transistors T31 and T34, when the other transistor (for example, transistor T34) forming the pair of the same phase with one transistor having an on-failure (for example, transistor T31) is turned on. Accordingly, an ON signal is output as the overcurrent detection signal from the corresponding overcurrent detection circuits (for example, overcurrent detection circuits 131 and 134) to the MG3 ECU 40c. This configuration enables the MG3 ECU 40c to detect the occurrence of an on-failure in either of the transistors T31 and T34.

As described above, when the main ECU 70 fails to monitor the temperature tm3 of the three-phase coils of the motor MG3 during emergency drive, the hybrid vehicle 20 of the embodiment performs the zero torque control of the motor MG3. In the case of an on-failure occurring in any of the transistors T31 to T36 of the inverter 43, this configuration enables the hybrid vehicle 20 to detect the on-failure.

In the hybrid vehicle 20 of the embodiment, when the main ECU 70 monitors the temperature tm3 of the three-phase coils of the motor MG3 during emergency drive, the MG3 ECU 40c performs the gate shutoff of the inverter 43 and the main ECU 70 performs the predetermined determination process. When the main ECU 70 fails to monitor the temperature tm3 of the three-phase coils of the motor MG3 during emergency drive, on the other hand, the MG3 ECU 40c performs the zero torque control of the motor MG3 and performs the predetermined determination process. According to a modification, during emergency drive, the MG3 ECU 40c may perform the zero torque control of the motor MG3 and perform the predetermined determination process, whether the main ECU 70 monitors or fails to monitor the temperature tm3 of the three-phase coils of the motor MG3.

In the hybrid vehicle 20 of the embodiment, when the main ECU 70 monitors the temperature tm3 of the three-phase coils of the motor MG3 during emergency drive, the MG3 ECU 40c performs the gate shutoff of the inverter 43 and the main ECU 70 performs the predetermined determination process based on the temperature tm3 of the three-phase coils of the motor MG3 and the phase currents Iu3, Iv3 and Iw3 of the respective phases of the motor MG3. According to a modification, the main ECU 70 may perform the predetermined determination process, based on only the temperature tm3 of the three-phase coils of the motor MG3.

The hybrid vehicle 20 of the embodiment uses the battery 50 as the power storage device. A capacitor may be used as the power storage device, in place of the battery 50.

Figure 4:
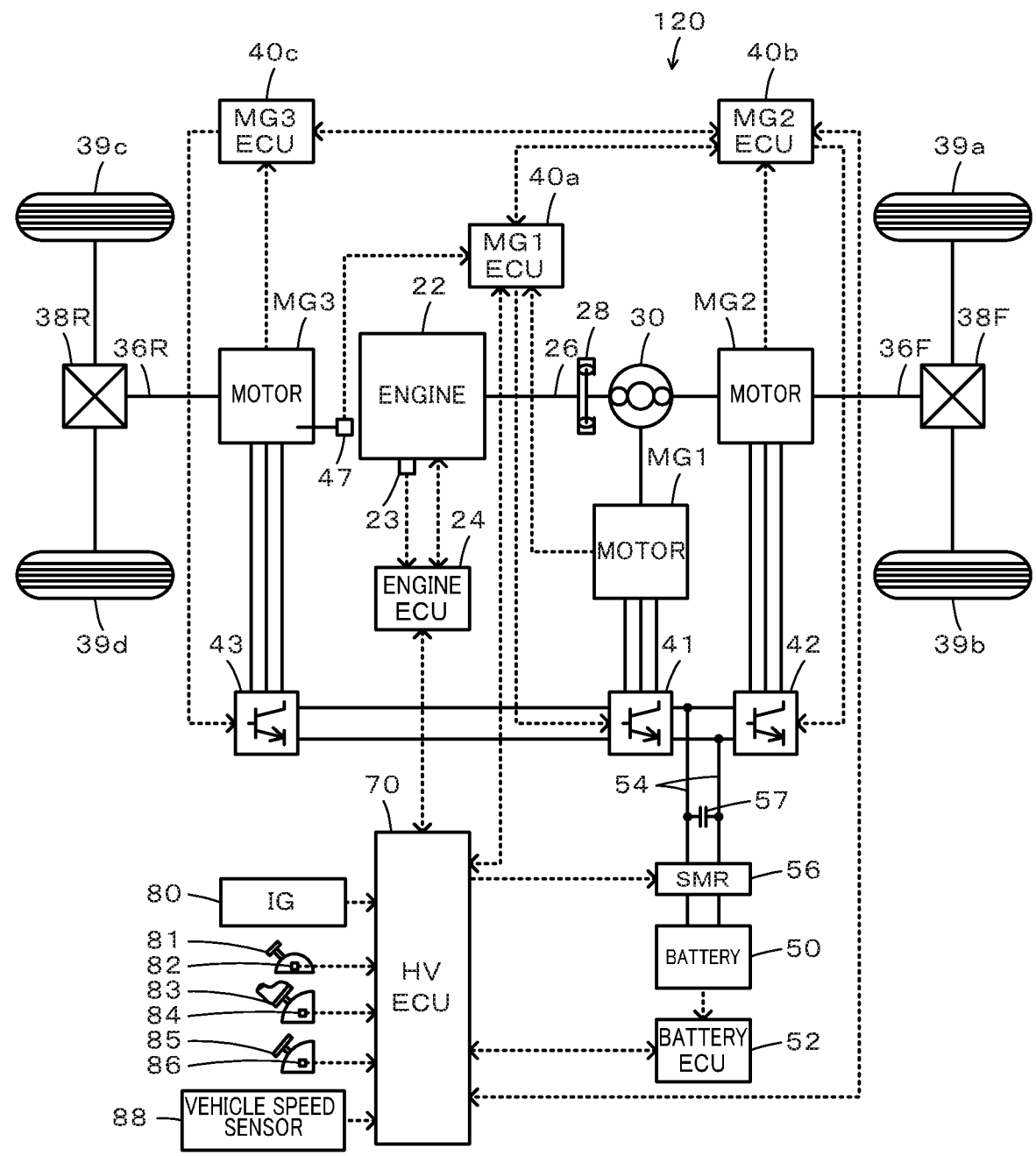
FIG. 4 is a configuration diagram illustrating the schematic configuration of another hybrid vehicle according to a modification.

The hybrid vehicle 20 of the embodiment is configured such that the temperature tm3 of the three-phase coils of the motor MG3 is input from the temperature sensor 47 to the main ECU 70. As shown in FIG. 4, a hybrid vehicle 120 according to a modification is configured such that the temperature tm3 of the three-phase coils of the motor MG3 is input from the temperature sensor 47 to the MG1 ECU 40a. In this modification, when the MG1 ECU 40a monitors the temperature tm3 of the three-phase coils of the motor MG3 during emergency drive, the MG3 ECU 40c may perform the gate shutoff of the inverter 43 and the MG1 ECU 40a may perform the predetermined determination process. When the MG1 ECU 40a fails to monitor the temperature tm3 of the three-phase coils of the motor MG3 during emergency drive, on the other hand, the MG3 ECU 40c may perform the zero torque control of the motor MG3 and perform the predetermined determination process.

Figure 5:
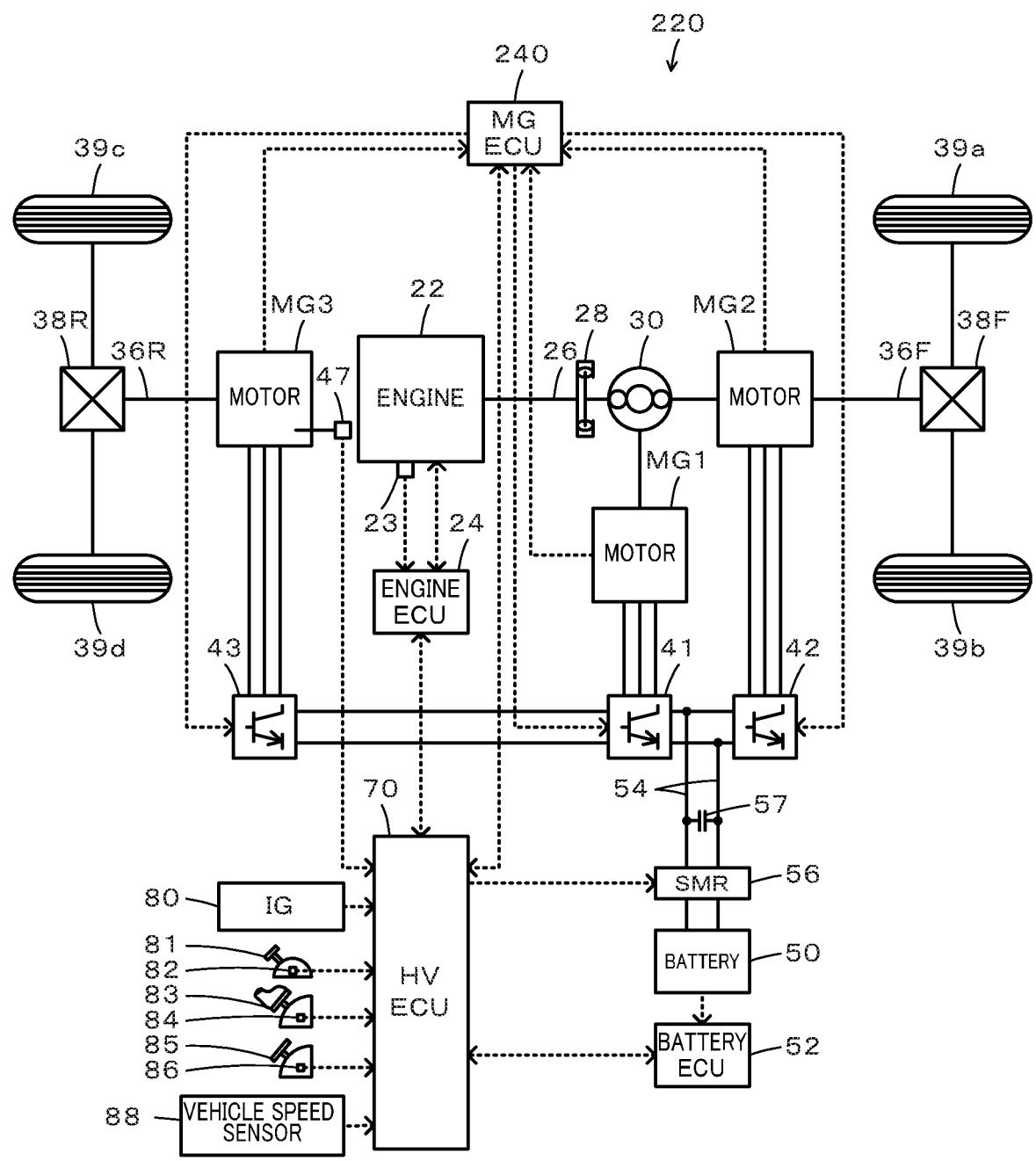
FIG. 5 is a configuration diagram illustrating the schematic configuration of another hybrid vehicle according to another modification.

The hybrid vehicle 20 of the embodiment is configured to include the MG1 ECU 40a, the MG2 ECU 40b and the MG3 ECU 40c. As shown in FIG. 5, in a hybrid vehicle 220 according to a modification, the MG1 ECU 40a, the MG2 ECU 40b and the MG3 ECU 40c may be configured by a single motor electronic control unit (hereinafter referred to as "motor ECU") 240. In this modification, when the main ECU 70 monitors the temperature tm3 of the three-phase coils of the motor MG3 during emergency drive, the motor ECU 240 may perform the gate shutoff of the inverter 43 and the main ECU 70 may perform the predetermined determination process. When the main ECU 70 fails to monitor the temperature tm3 of the three-phase coils of the motor MG3 during emergency drive, on the other hand, the motor ECU 70 may perform the zero torque control of the motor MG3 and perform the predetermined determination process.

The hybrid vehicle 20 of the embodiment is configured to include the MG1 ECU 40a, the MG2 ECU 40b, the MG3 ECU 40c, the engine ECU 24, the battery ECU 52 and the main ECU 70. According to a modification, at least two of these ECUs may be configured by a single electronic control unit.

Figure 6:
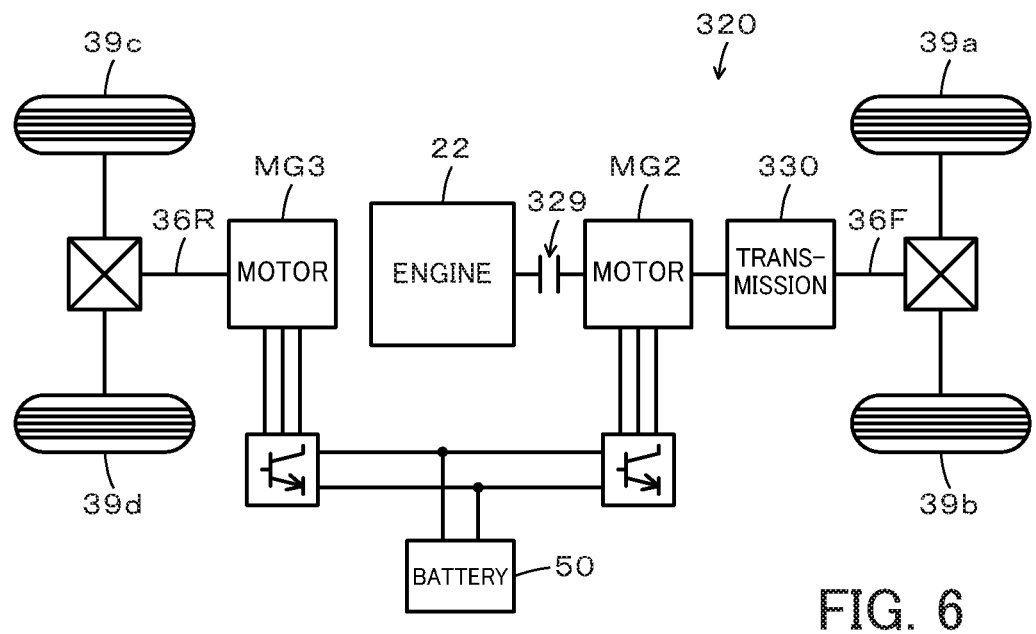
FIG. 6 is a configuration diagram illustrating the schematic configuration of another hybrid vehicle according to another modification.
Figure 7:
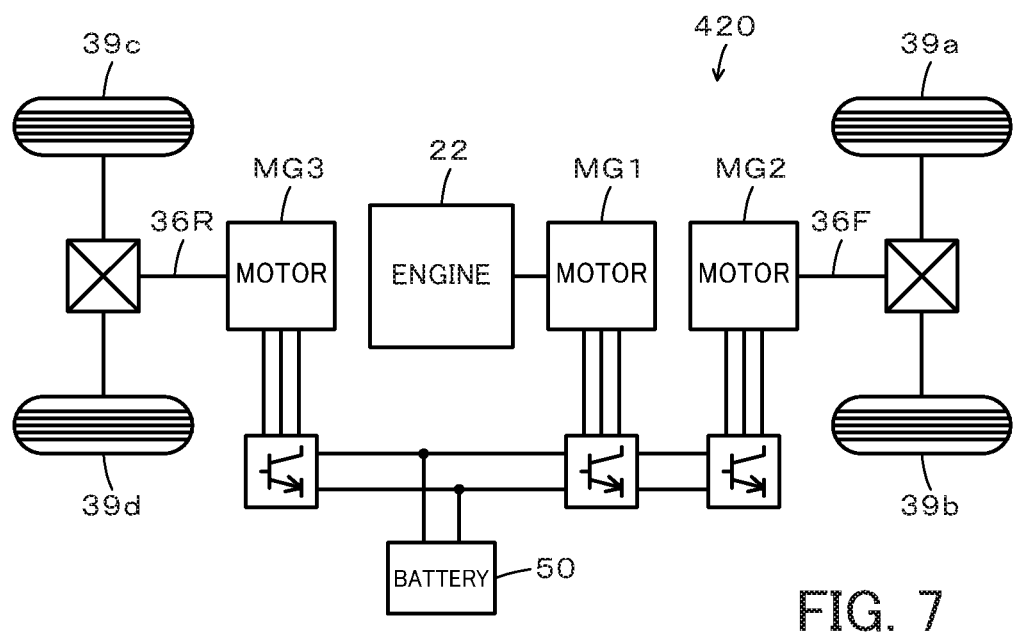
FIG. 7 is a configuration diagram illustrating the schematic configuration of another hybrid vehicle according to another modification and FIG. 8 is a configuration diagram illustrating the schematic configuration of an electric vehicle.

The hybrid vehicle 20 of the embodiment is configured such that the engine 22 and the motor MG1 are connected via the planetary gear 30 with the driveshaft 36F coupled with the front wheels 39a and 39b, that the motor MG2 is connected with the driveshaft 36F, that the motor MG3 is connected with the driveshaft 36R coupled with the rear wheels 39c and 39d, and that the battery 50 is connected with the motors MG1, MG2 and MG3 via the power lines 54. The present disclosure is also applicable to a hybrid vehicle 320 according to a modification shown in FIG. 6, which is configured such that a motor MG2 is connected via a transmission 330 with the driveshaft 36F coupled with the front wheels 39a and 39b, that the engine 22 is connected with the motor MG2 via a clutch 329, that a motor MG3 is connected with the driveshaft 36R coupled with the rear wheels 39c and 39d, and that the battery 50 is connected with the motors MG2 and MG3 via the power lines 54. The present disclosure is also applicable to a hybrid vehicle 420 according to a modification shown in FIG. 7, which is configured as a series hybrid vehicle such that a motor MG1 for power generation is connected with the engine 22, that a motor MG2 for driving is connected with the driveshaft 36F coupled with the front wheels 39a and 39b, that a motor MG3 is connected with the driveshaft 36R coupled with the rear wheels 39c and 39d, and that the battery 50 is connected with the motors MG1, MG2 and MG3 via the power lines 54.

Figure 8:
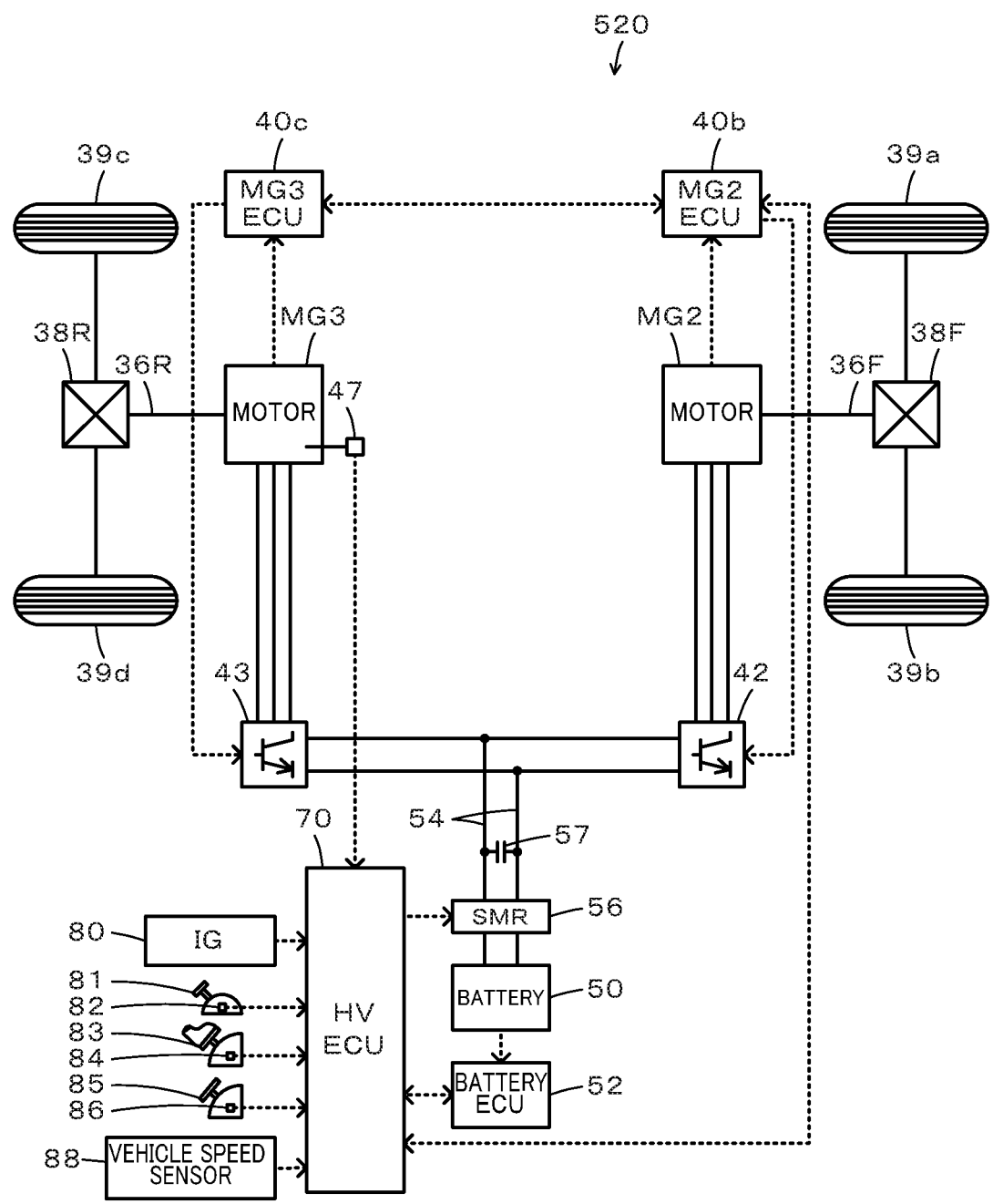

The embodiment describes application of the present disclosure to the configuration of the hybrid vehicle 20 including the engine 22, the planetary gear 30, the motors MG1, MG2 and MG3 and the battery 50 as shown in FIG. 1. The present disclosure may be applied to the configuration of an electric vehicle 520 shown in FIG. 8 with omission of the engine 22, the planetary gear 30, the motor MG1 and the like from the configuration of the hybrid vehicle 20 shown in FIG. 1.

In the motor vehicle of this aspect, when temperature of a coil of the second motor is monitored during the emergency drive, the control device may perform gate shutoff of the second inverter and determine whether an on-failure occurs in any of the plurality of second switching elements, based on the temperature of the coil. In this case, when the temperature of the coil is monitored during the emergency drive, the control device may determine whether an on-failure occurs in any of the plurality of second switching elements, based on the temperature of the coil and phase currents of respective phases of the second motor. In the case of an on-failure occurring in any of the plurality of switching elements included in the second inverter, this configuration enables the on-failure to be detected, based on the temperature of the coil of the second motor and the like.

In the motor vehicle of another aspect, the control device may include a first controller configured to determine whether an on-failure occurs in any of the plurality of second switching elements, based on at least the temperature of the coil, when the first controller monitors the temperature of the coil and a second controller configured to control the second inverter. The second controller may perform the zero torque control when the first controller fails to monitor the temperature of the coil. In the case of an on-failure occurring in any of the plurality of switching elements included in the second inverter, this configuration enables the on-failure to be detected by a technique according to whether or not the first controller monitors the temperature of the coil.

The following describes the correspondence relationship between the primary components of the embodiment and the primary components of the disclosure described in Summary. The motor MG2 of the embodiment corresponds to the "first motor", the inverter 42 corresponds to the "first inverter", the motor MG3 corresponds to the "second motor", the inverter 43 corresponds to the "second inverter", the battery 50 corresponds to the "power storage device", the main ECU 70, MG1 ECU 40a, MG2 ECU 40b and MG3 ECU 40c correspond to the "control device" and the overcurrent detection circuits 131 to 136 and MG3 ECU 40c correspond to the "overcurrent detector".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The technique of the disclosure is preferably applicable to the manufacturing industries of the motor vehicle and so on.

The invention claimed is:

1. A motor vehicle comprising:
a first motor connected with one wheels out of front wheels and rear wheels;
a first inverter configured to drive the first motor by switching of a plurality of first switching elements;
a second motor connected with the other wheels out of the front wheels and the rear wheels;
a second inverter configured to drive the second motor by switching of a plurality of second switching elements;
a power storage device connected with the first inverter and the second inverter via a power line;
a control device configured to control the first inverter and the second inverter; and
an overcurrent detector configured to detect overcurrent in each of the plurality of second switching elements,
wherein when the motor vehicle has an abnormality and is driven by emergency drive with output of a torque from the first motor to the one wheels, the control device performs zero torque control that controls the second inverter such that a torque of the second motor becomes equal to zero, and
wherein when temperature of a coil of the second motor is monitored during the emergency drive, the control device performs gate shutoff of the second inverter and determines whether an on-failure occurs in any of the plurality of second switching elements, based on the temperature of the coil.

2. The motor vehicle according to claim 1,
wherein when the temperature of the coil is monitored during the emergency drive, the control device determines whether an on-failure occurs in any of the plurality of second switching elements, based on the temperature of the coil and phase currents of respective phases of the second motor.

3. The motor vehicle according to claim 1,
wherein the control device comprises:
a first controller configured to determine whether an on-failure occurs in any of the plurality of second switching elements, based on at least the temperature of the coil, when the first controller monitors the temperature of the coil; and
a second controller configured to control the second inverter, wherein
the second controller performs the zero torque control when the first controller fails to monitor the temperature of the coil.

4. The motor vehicle according to claim 2,
wherein the control device comprises:
a first controller configured to determine whether an on-failure occurs in any of the plurality of second switching elements, based on at least the temperature of the coil, when the first controller monitors the temperature of the coil; and
a second controller configured to control the second inverter, wherein
the second controller performs the zero torque control when the first controller fails to monitor the temperature of the coil.

* * * * *